Patented Feb. 25, 1947

2,416,508

UNITED STATES PATENT OFFICE 2,416,508

SEPARATION OF IRON FROM ALUMINUM SULPHATE SOLUTIONS

Robert B. Barnes, Stamford, and Garnet P. Ham, Old Greenwich, Conn., assignors to American Cyanamid Company, New York, N. Y., a corporation of Maine No Drawing. Application May 13, 1944, Serial No. 535,540

7 Claims. (Cl. 23—118)

The present invention relates to the separation of iron from $Al_2(SO_4)_3$ in aqueous solutions.

In the metallic aluminum industry, where the metal is normally produced from alumina, it is important that iron be eliminated from the alumina so as to leave the former in as pure a state as possible. Many proposals have been made for the precipitation of iron at an intermediate stage in the conversion of bauxite, clays and other aluminum-bearing earths, to alumina. These methods are cumbersome and inefficient inasmuch as they involve large quantities of liquids and usually contemplate precipitation of the iron as the hydroxide, which is most difficult to filter. The reagents used are bulky, which also adds to the total volume of material to be handled.

The principal object of the present invention is to remove iron from $Al_2(SO_4)_3$ solutions in a simple manner without adding greatly to the bulk of materials handled.

The invention is based upon the discovery that the formation of an aluminum xanthate requires a greater length of time than does the xanthate of iron. As a consequence, by adding a water soluble ester of xanthic acid to an aqueous solution containing $Al_2(SO_4)_3$ and iron under proper controlled conditions, the iron may be thrown out of solution before any appreciable amounts of aluminum xanthate have been formed. Thus, the iron xanthate may be readily separated from the liquid without aluminum loss.

There are a number of important factors which contribute largely to the success of the herein described method. For instance, it has been found that best results are obtainable when the pH of the solution from which the iron is being precipitated is in the neighborhood of 3.5. It has also been found that the iron may be more efficiently precipitated when it is in the ferric state and, consequently, steps should be taken to convert ferrous iron to ferric iron prior to precipitation. Again, during the xanthation process, the iron precipitate normally is colloidal in nature and thus difficult to filter. If, however, precipitation takes place with strong agitation, an agglomeration of the precipitated iron particles occurs with the result that a crystalline or granular form is assumed by the precipitate and the latter may be easily filtered.

Generally speaking, the objects of the invention may be accomplished by adding to an aqueous solution of $Al_2(SO_4)_3$ containing iron, an oxidizing agent such as potassium permanganate, sodium perchlorate, hydrogen peroxide, manganese dioxide, calcium hypochlorite or the like to convert any ferrous iron to the ferric state. A water soluble ester of xanthic acid such as any of the alkali metal-alkyl xanthates and particularly sodium ethyl xanthate, is then added with agitation. The iron is first precipitated as an abundant dark brown, finely divided precipitate in a highly dispersed state. Upon agitation, however, this material agglomerates to form a heavy black crystalline precipitate, a part of which settles rapidly, while the remainder floats. Both portions of the solids may be readily filtered and under the above circumstances, only small amounts of aluminum are found in the precipitate while the content of iron in the solution has been appreciably reduced.

The iron xanthate precipitate upon being treated with an alkali, such as ammonium hydroxide, may be reconverted into a water-soluble xanthate and substantially pure $Fe_2O_3$. The latter may be separated by filtration and the former used as make-up xanthate in a cyclic process.

Any aqueous solutions of $Al_2(SO_4)_3$ may be thus treated to remove its iron component. However, inasmuch as aqueous solutions of $Al_2(SO_4)_3$ have a low pH, and xanthic acid esters are more or less unstable under these conditions, it is desirable to adjust the pH of the $Al_2(SO_4)_3$ solution to a point where xanthate decomposition is minimized. Actually this point cannot be reached because if the pH becomes too high, not only is the iron precipitated as hydroxide but the aluminum comes down as the hydrate as well. However, at a pH of 3.5, while the acidity is such that some xanthate is lost through decomposition yet this point approaches the optimum conditions between loss of aluminum through hydrate precipitation and loss of xanthate through acid decomposition. As a consequence, it is always desirable to use an amount of xanthate more than theoretically necessary to react with the iron present, calculated as $Fe_2O_3$. This theoretical ratio of xanthic acid ester to iron is approximately 5.2:1. The amount of xanthate thus used should be greater than this ratio to compensate for decomposition losses. The ratio may go up to as high as 12 or 15:1, depending upon the degree of acidity of the $Al_2(SO_4)_3$ solution, although normally from 10 to 2:1 will remove from 80 to 90% of the iron content.

It has also been found in some cases that better results were obtained through multiple stage xanthation rather than in a single operation. The same ratios hold for multiple operations calculated as total xanthate to iron, all as will be illustrated in the examples.

Normally, most aqueous solutions of $Al_2(SO_4)_3$ have a pH below 3. They may be brought to the arbitrary 3.5 point by any type of alkali which will not cause a precipitation of the iron or aluminum as hydrate. Soda ash is preferred and if added as a solid, no undue addition to the bulk of materials handled is involved.

Experiments have demonstrated that the iron content of $Al_2(SO_4)_3$ solutions is inefficiently precipitated unless the iron is in the ferric state. As a consequence, oxidizing agents may be used, although best results have been obtained with a 10% solution of potassium permanganate, adding the same with stirring until a slight pink color persists.

Any alkali metal-alkyl xanthate may be used. Desirable results have been obtained not only with sodium ethyl xanthate but also with sodium isopropyl xanthate, potassium amyl xanthate and the like. It is desirable to use the xanthic acid ester as a 10% aqueous solution.

When the xanthic acid ester is added to the conditioned $Al_2(SO_4)_3$ solution containing ferric iron, an abundant and spontaneous precipitate of an iron xanthate is immediately formed. While some aluminum xanthate is also formed, yet this material occurs in exceedingly small amounts and only after a protracted time period. This difference in the precipitate forming times permits removal of the iron xanthate by rapid filtration without loss of aluminum.

When the iron is first precipitated as xanthate, it comes down as a dark brown, finely divided dispersion which is extremely difficult to filter and will not settle out on a standing period short of aluminum xanthate formation. It was discovered, however, that if either the menstruum containing the dispersed iron xanthate is violently agitated or if agitation is continued during the xanthate addition, the dark brown dispersion is converted to heavy black crystalline agglomerates, some of which float and some of which sink but all of which may be readily and quickly filtered from the solution prior to the formation of any appreciable amount of aluminum xanthate.

It is to be noted at this point that the iron has been removed without adding materially to the bulk of the original solution as the only liquids added are the oxidizing agent and the xanthic acid ester. These volumes, however, are comparatively small.

The iron xanthate cake, upon being treated with an alkali such as ammonium hydroxide, is reconverted to a water-soluble xanthate, leaving a relatively pure $Fe_2O_3$ behind. This solution of xanthate may be used as such in the following cycle or it may be mixed with one of the above mentioned xanthates for the same purpose.

Throughout the examples where the word "alum" is used, $Al_2(SO_4)_3$ is meant.

EXAMPLE I 500 ml. of a crude alum solution (32° Bé., pH 2.3 and from which the solids have been filtered) was oxidized in the cold by 4.4 ml. of a 10% potassium permanganate solution. The total iron content was 1360 parts per million. 10 ml. of this solution were treated with 3 ml. of a 10% sodium ethyl xanthate solution. This represented a ratio of xanthate to iron calculated as $Fe_2O_3$ of 10:1. The solution was agitated vigorously and then filtered. The clear filtrate when analyzed spectrophotometrically showed 50 P. P. M. iron remaining. This represents a 93% removal.

EXAMPLE II 50 ml. of the same solution as above containing 1360 P. P. M. total iron was treated with 5 ml. of 10% sodium ethyl xanthate. This was a xanthate ratio of 10 to 1. After agitating and filtering the clear solution was used for a second stage of xanthation.

The clear solution was oxidized with 10% potassium permanganate until a pink color persisted. 0.4 ml. of 10% sodium ethyl xanthate was then added. After agitation and filtering, the clear solution contained 59 P. P. M. of total iron. This represented a 95% removal with a total xanthate ratio to iron of 12:1.

EXAMPLE III

A portion of the alum solution of Example I was preoxidized with 10% potassium permanganate until a pink color persisted. 10 ml. of the solution was then treated with 0.4 ml. of 10% sodium ethyl xanthate solution. This represented a ratio of 2:1. After agitation, it was filtered and the filtrate used in Stage 2.

The clear solution was oxidized and xanthated the second time, following the above procedure and the filtrate used for a third stage.

In this final stage, oxidation and xanthation took place as above, giving a final solution which, upon xanthation, showed only 13 P. P. M. of iron remaining. This represents a 99% removal of iron, using a total xanthate ratio of 6:1, extended over three stages.

EXAMPLE IV 2500 ml. of an alum solution (32° Bé., pH 2.3 and from which the solids have been filtered) and containing 1150 P. P. M. of iron, was preoxidized with 10% potassium permanganate until a pink color persisted. It was then placed in a Fagergren flotation cell and conditioned by agitation. 160 ml. of 10% sodium ethyl xanthate solution and pine oil as a frothing agent, was added (xanthate to iron ratio 4:1). Aeration was started and the heavy black precipitate scraped from the swirling surface. After 14 minutes of operation, the solution was filtered and reserved for the second stage of xanthation.

In the second stage, the above solution was oxidized as before and 160 ml. of sodium ethyl xanthate added. This is a ratio of 3:1. The aeration and floatation was continued for twenty-four minutes, the solution filtered, and reserved for the third stage of xanthation.

In this final stage, the solution was reoxidized as before and 110 ml. of 10% sodium ethyl xanthate added. This represents a ratio of 2:1. No frothing agent was used in this stage. The aeration and floatation operation lasted for fifteen minutes. Upon filtering the solution and analyzing it for iron, it was found that 45 P. P. M. remained. This is a 96% removal of iron with a total ratio of xanthate to iron calculated as $Fe_2O_3$ of 9:1.

EXAMPLE V 250 ml. of the alum solution used in Example IV were placed in a laboratory flotation machine having a pusher type propeller and air diffuser and surface vanes. The latter were used to create a surface swirling action. The solution was not preoxidized. 1.6 grams of sodium ethyl xanthate in 5 ml. of water were added with a small quantity of pine oil as a frothing agent. Agitation and air were used and a heavy agglomerated brown-black precipitate occurred which could be conveniently scraped off the liquid's surface. This operation was continued for fifteen minutes and the solution filtered and reserved for the second stage. The xanthate-iron ratio was 4:1.

*Stage 2*

The filtrate from the above was oxidized with 10% permanganate and then 2.0 grams of 10% sodium ethyl xanthate in 5 ml. of water, which represented a xanthate-iron ratio of 5:1. Pine oil was again used as a frothing agent. After fifteen minutes of operation similar to that used for Stage 1, the solution was filtered to free it from the precipitate and reserved for Stage 3.

*Stage 3*

The above solution was oxidized with 10% permanganate. 1.2 grams of 10% sodium ethyl xanthate in 5 ml. of water and representing a ratio of 3:1 were used for xanthation. Pine oil was used as a frothing agent. After fifteen minutes of agitation and aeration, the solution was treated with 0.1 ml. of 5% copper sulfate. After a short standing period, the entire solution was filtered to remove all precipitate.

The original solution contained 1150 p. p. m. of iron. After the first xanthation, this had decreased to 810 p. p. m., after the second to 175 p. p. m., and after the third, to 18 p. p. m. This represented a total iron removal of 98% with the xanthate to iron ratio of 12:1.

EXAMPLE VI 40 ml. of the alum solution of Example IV were treated with six grams of solid sodium carbonate to adjust the pH to 3.5. This solution was then treated in three successive xanthation stages, using sodium ethyl xanthate in the respective ratios of 4:1, 3:1 and 3:1. The initial solution contained 1150 p. p. m. of total iron, which was decreased after the three stages of xanthation to 435 p. p. m., 145 p. p. m. and 30 p. p. m., respectively. No oxidation was used in this experiment.

EXAMPLE VII

Example I was repeated, using sodium isopropyl xanthate in a single xanthation stage in a ratio of 10:1. After agitation and filtering, the clear solution contained 85 p. p. m. total iron.

EXAMPLE VIII 5 parts by weight of an iron xanthate as obtained in Example VI were placed in a filter funnel and ten parts by volume of 10% ammonium hydroxide were poured in. In a short period of time, the dark brownish-black precipitate gradually changed to an orange-red, and the filtrate obtained was a yellow-green color.

The entire quantity of filtrate was added to 10 ml. of an alum solution containing 1285 p. p. m. of total iron. After agitation and filtration, the clear solution was found to contain only 63 p. p. m. total iron, which represented a 95% removal.

Thus, the xanthate may be regenerated and recycled with efficient results.

While the invention has been described with particular reference to specific embodiments, it is to be understood that it is not to be limited thereto, but is to be construed broadly and restricted solely by the scope of the appended claims.

What is claimed:

1. A method of precipitating iron from a solution containing it and $Al_2(SO_4)_3$ which includes adjusting the pH of the solution to not less than 3.5 and adding thereto, a water soluble alkyl xanthate.

2. A method of precipitating iron from a solution containing it and $Al_2(SO_4)_3$ which includes adjusting the pH of the solution to not less than 3.5 and adding thereto a water soluble alkyl xanthate in a ratio to the iron content greater than 5.2:1.

3. A method of precipitating iron from a solution containing it and $Al_2(SO_4)_3$ which includes adjusting the pH of the solution to not less than 3.5, adding an oxidizing agent to convert ferrous iron to the ferric state, and adding thereto a water soluble alkyl xanthate.

4. A method of precipitating iron from a solution containing it and $Al_2(SO_4)_3$, which includes adding thereto sodium ethyl xanthate.

5. A method of precipitating iron from a solution containing it and $Al_2(SO_4)_3$ which includes adjusting the pH of the solution to not less than 3.5, adding thereto a water soluble alkyl xanthate and agitating the mixture until the iron xanthate has agglomerated.

6. A method of precipitating iron from a solution containing it and $Al_2(SO_4)_3$ which includes adjusting the pH of the solution to not less than 3.5 and adding thereto, a water soluble alkyl xanthate, with agitation.

7. A method of precipitating iron from a solution containing it and $Al_2(SO_4)_3$ which includes adjusting the pH of the solution to not less than 3.5 and adding thereto, a water soluble alkyl xanthate, with agitation, and removing the iron xanthate before the formation of a substantial amount of aluminum xanthate.

ROBERT B. BARNES.
GARNET P. HAM.

REFERENCES CITED

The following references are of record in the file of this patent:

UNITED STATES PATENTS

| Number | Name | Date |
| --- | --- | --- |
| 2,146,439 | Oplinger | Feb. 7, 1939 |
| 2,019,554 | Derr | Nov. 5, 1935 |
| 1,421,804 | Mejdell | July 4, 1922 |
| 2,169,540 | Shelton | Aug. 15, 1939 |
| 1,778,987 | Stevens | Oct. 21, 1930 |
| 1,252,648 | Barnett et al | Jan. 8, 1918 |